(12) United States Patent
Weiss et al.

(10) Patent No.: US 12,031,835 B2
(45) Date of Patent: Jul. 9, 2024

(54) PARKING ASSIST IN AUGMENTED REALITY HEAD-UP DISPLAY SYSTEM

(71) Applicant: GM Global Technology Operations LLC, Detroit, MI (US)

(72) Inventors: John P. Weiss, Shelby Township, MI (US); Joseph F. Szczerba, Grand Blanc, MI (US); Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 17/713,538

(22) Filed: Apr. 5, 2022

(65) Prior Publication Data
US 2023/0314157 A1 Oct. 5, 2023

(51) Int. Cl.
*G01C 21/36* (2006.01)
*B60K 35/00* (2006.01)
*G02B 27/01* (2006.01)
*G06F 3/01* (2006.01)
*G06V 20/20* (2022.01)
(Continued)

(52) U.S. Cl.
CPC ............ *G01C 21/365* (2013.01); *B60K 35/00* (2013.01); *G02B 27/0101* (2013.01); *G02B 27/0179* (2013.01); *G06F 3/013* (2013.01); *G06V 20/20* (2022.01); *G06V 20/586* (2022.01); *B60K 35/22* (2024.01); *B60K 35/28* (2024.01); *B60K 35/654* (2024.01); *B60K 2360/1526* (2024.01); *B60K 2360/166* (2024.01); *B60K 2360/21* (2024.01); *G02B 2027/014* (2013.01); *G02B 2027/0141* (2013.01); *G02B 2027/0187* (2013.01)

(58) Field of Classification Search
None
See application file for complete search history.

(56) References Cited

U.S. PATENT DOCUMENTS

| 10,416,548 | B1 * | 9/2019 | Yett ...................... G03B 21/562 |
| 2012/0086798 | A1 * | 4/2012 | Iwazaki ............. B62D 15/0295 348/118 |

(Continued)

FOREIGN PATENT DOCUMENTS

WO WO-2017159510 A1 * 9/2017 ............... B60R 1/00

*Primary Examiner* — Jwalant Amin
(74) *Attorney, Agent, or Firm* — Vivacqua Crane, PLLC (57) ABSTRACT

A head-up display system includes a first plurality of on-board sensors adapted to detect vehicle driving characteristics, a wireless communication module adapted to receive information from external sources, a driver monitoring system adapted to track a driver's eyes, and a controller in electronic communication with the first plurality of on-board sensors and the wireless communication module, the controller adapted to determine if the vehicle is performing a parking maneuver, and, when the vehicle is performing a parking maneuver, to capture images of an environment surrounding the vehicle, detect objects within the environment, identify location markers for a parking space and objects within the environment surrounding the vehicle adjacent to the parking space, determine the position of the vehicle relative to the identified location markers and objects, and display, with a projection module a parking assist graphic adapted to provide guidance to a driver of the vehicle.

20 Claims, 5 Drawing Sheets

(51) Int. Cl.
*G06V 20/58* (2022.01)
*B60K 35/22* (2024.01)
*B60K 35/28* (2024.01)
*B60K 35/65* (2024.01)

(56) References Cited

U.S. PATENT DOCUMENTS

| | | | |
|---|---|---|---|
| 2015/0179075 A1* | 6/2015 | Lee | G08G 1/165 |
| | | | 340/932.2 |
| 2016/0075374 A1* | 3/2016 | Yamashita | B62D 15/0285 |
| | | | 701/41 |
| 2016/0284217 A1* | 9/2016 | Lee | B62D 15/0285 |
| 2019/0111970 A1* | 4/2019 | Choi | B62D 15/027 |
| 2019/0276044 A1* | 9/2019 | Bae | B60R 16/023 |
| 2021/0055547 A1* | 2/2021 | Rao | G06F 3/013 |

* cited by examiner

PARKING ASSIST IN AUGMENTED REALITY HEAD-UP DISPLAY SYSTEM

The present disclosure relates to a head-up display and more particularly to a system and method for providing lane position alerts to a driver of a vehicle.

A head-up display (HUD) has become common in modern automobiles. HUDs project useful information like speed and navigation information into the driver's field of view. This avoids forcing the driver to look down, away from the road, to read gages on the dash of the automobile. This reduces driver distractions and keeps the driver's eyes on the road.

Augmented reality (AR) involves enhancing the real world with virtual elements that are shown in three-dimensional space and that permit real-time interaction with users. A head-up display shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness While current augmented reality head-up displays achieve their intended purpose, there is a need for a new and improved system and method of providing parking assist graphics to a driver of a vehicle.

SUMMARY

According to several aspects of the present disclosure, a method of providing parking assistance to a driver of a vehicle with a head-up system includes detecting, with a first plurality of on-board sensors, vehicle driving characteristics, receiving, with a wireless communication module, information from external sources, tracking, with a driver monitoring system, a position of the driver's eyes, determining, with a controller in electronic communication with the first plurality of on-board sensors and the wireless communication module if the vehicle is performing a parking maneuver, based on data from the first plurality of on-board sensors and data received by the wireless communication module, and when the vehicle is performing a parking maneuver, displaying, with at least one light source of a projection module adapted to project an image upon an inner surface of a windshield of the vehicle and in electronic communication with the controller, a parking assist graphic adapted to provide guidance to a driver of the vehicle while parking the vehicle in a parking space.

According to another aspect, the displaying, with the at least one light source of the projection module adapted to project an image upon an inner surface of a windshield of the vehicle and in electronic communication with the controller, a parking assist graphic adapted to provide guidance to a driver of the vehicle while parking the vehicle in a parking space further includes capturing, with at least one image capturing device in electronic communication with the controller, images of an environment surrounding the vehicle, detecting, with at least one non-visual sensor in electronic communication with the controller, objects within the environment surrounding the vehicle, identifying, with the controller, the at least one image capturing device, and the at least one non-visual sensor, location markers for the parking space and objects within the environment surrounding the vehicle adjacent to the parking space, and determining, with the controller, the position of the vehicle relative to the identified location markers for the parking space and objects within the environment surrounding the vehicle adjacent to the parking space.

According to another aspect, when no objects are detected in the environment surrounding the vehicle adjacent to the parking space, the displaying parking assist graphics further includes, displaying, with the at least one light source of the projection module, a parking assist graphic adapted to guide the driver of the vehicle to a position centered within the identified location markers.

According to another aspect, when objects are detected in the environment surrounding the vehicle adjacent to the parking space on one side, the displaying parking assist graphics further includes, displaying, with the at least one light source of the projection module, a parking assist graphic adapted to guide the driver of the vehicle to a position within the identified location markers and offset from the detected objects in the environment surrounding the vehicle adjacent to the parking space on one side.

According to another aspect, when objects are detected in the environment surrounding the vehicle adjacent to the parking space on both sides, the displaying parking assist graphics further includes, displaying, with the at least one light source of the projection module, a parking assist graphic adapted to guide the driver of the vehicle to a position within the identified location markers and centered between the detected objects in the environment surrounding the vehicle adjacent to the parking space on both sides.

According to another aspect, when objects are detected in the environment surrounding the vehicle adjacent to the parking space, the displaying parking assist graphics further includes, displaying, with the at least one light source of the projection module, a parking assist graphic adapted to guide the driver of the vehicle while entering and exiting the parking space to avoid the detected objects in the environment surrounding the vehicle adjacent to the parking space.

According to another aspect, the method further includes detecting, with a second plurality of on-board sensors in electronic communication with the controller, locations of passengers within the vehicle.

According to another aspect, when no objects are detected in the environment surrounding the vehicle adjacent to the parking space, the displaying parking assist graphics further includes, displaying, with the at least one light source of the projection module, a parking assist graphic adapted to guide the driver of the vehicle to a position offset within the identified location markers based on the location of passengers within the vehicle.

According to another aspect, when objects are detected in the environment surrounding the vehicle adjacent to the parking space on one side, the displaying parking assist graphics further includes, displaying, with the at least one light source of the projection module, a parking assist graphic adapted to guide the driver of the vehicle to a position within the identified location markers and offset relative to the detected objects in the environment surrounding the vehicle adjacent to the parking space on one side, based on the location of passengers within the vehicle.

According to another aspect, when objects are detected in the environment surrounding the vehicle adjacent to the parking space on both sides, the displaying parking assist graphics further includes, displaying, with the at least one light source of the projection module, a parking assist graphic adapted to guide the driver of the vehicle to a position within the identified location markers and offset between the detected objects in the environment surrounding the vehicle adjacent to the parking space on both sides, based on the location of passengers within the vehicle.

According to another aspect, the controller is further adapted to continuously identify location markers and objects within the environment surrounding the vehicle adjacent to the parking space and determine the position of the vehicle relative to the identified location markers and objects within the environment surrounding the vehicle adjacent to the parking space, the method further including updating the displayed parking assist graphic as the position of the vehicle relative to the identified location markers and objects within the environment surrounding the vehicle adjacent to the parking space changes.

According to another aspect, the system is adapted to be selectively actuated by the operator and to be actuated automatically when the vehicle begins a parking maneuver.

According to another aspect, the at least one light source is adapted to project images within a near image plane of the windshield and a far image plane of the windshield, the displaying, with at least one light source of a projection module adapted to project an image upon an inner surface of a windshield of the vehicle and in electronic communication with the controller, a parking assist graphic adapted to provide guidance to a driver of the vehicle while parking the vehicle in a parking space further includes, displaying the parking assist graphics within the far image plane.

According to several aspects of the present disclosure, a head-up display system for an automotive vehicle includes a first plurality of on-board sensors adapted to detect vehicle driving characteristics, a wireless communication module adapted to receive information from external sources, a driver monitoring system adapted to track a position of a driver's eyes, and a controller in electronic communication with the first plurality of on-board sensors and the wireless communication module, the controller adapted to determine if the vehicle is performing a parking maneuver, based on data from the first plurality of on-board sensors and data received by the wireless communication module, and, when the vehicle is performing a parking maneuver, to capture, with at least one image capturing device in electronic communication with the controller, images of an environment surrounding the vehicle, detect, with at least one non-visual sensor in electronic communication with the controller, objects within the environment surrounding the vehicle, identify, with the controller, the at least one image capturing device, and the at least one non-visual sensor, location markers for a parking space and objects within the environment surrounding the vehicle adjacent to the parking space, determine the position of the vehicle relative to the identified location markers for the parking space and objects within the environment surrounding the vehicle adjacent to the parking space, and display, with at least one light source of a projection module adapted to project an image upon an inner surface of a windshield of the vehicle and in electronic communication with the controller, a parking assist graphic adapted to provide guidance to a driver of the vehicle while parking the vehicle in the parking space.

According to another aspect, when no objects are detected in the environment surrounding the vehicle adjacent to the parking space, the system is adapted to display a parking assist graphic adapted to guide the driver of the vehicle to a position centered within the identified location markers.

According to another aspect, when objects are detected in the environment surrounding the vehicle adjacent to the parking space, the system is adapted to display a parking assist graphic adapted to guide the driver of the vehicle to a position within the identified location markers and offset from the detected objects, when the detected objects are located in the environment surrounding the vehicle adjacent to the parking space on one side, display a parking assist graphic adapted to guide the driver of the vehicle to a position within the identified location markers and centered between the detected objects, when the detected objects are located in the environment surrounding the vehicle adjacent to the parking space on both sides, and display a parking assist graphic adapted to guide the driver of the vehicle while entering and exiting the parking space to avoid the detected objects in the environment surrounding the vehicle adjacent to the parking space.

According to another aspect, the system further includes a second plurality of on-board sensors in electronic communication with the controller and adapted to detect locations of passengers within the vehicle, wherein when no objects are detected in the environment surrounding the vehicle adjacent to the parking space, the system is adapted to display a parking assist graphic adapted to guide the driver of the vehicle to a position offset within the identified location markers based on the location of passengers within the vehicle; when objects are detected in the environment surrounding the vehicle adjacent to the parking space on one side, the system is adapted to display a parking assist graphic adapted to guide the driver of the vehicle to a position within the identified location markers and offset relative to the detected objects based on the location of passengers within the vehicle, and when objects are detected in the environment surrounding the vehicle adjacent to the parking space on both sides, the system is adapted to display a parking assist graphic adapted to guide the driver of the vehicle to a position within the identified location markers and offset between the detected objects in the environment surrounding the vehicle adjacent to the parking space on both sides, based on the location of passengers within the vehicle.

According to another aspect, the controller is further adapted to continuously identify location markers and objects within the environment surrounding the vehicle adjacent to the parking space and determine the position of the vehicle relative to the identified location markers and objects within the environment surrounding the vehicle adjacent to the parking space, and update the displayed parking assist graphic as the position of the vehicle relative to the identified location markers and objects within the environment surrounding the vehicle adjacent to the parking space changes.

According to another aspect, the system is adapted to be selectively actuated by the operator and to be actuated automatically when the vehicle begins a parking maneuver.

According to another aspect, the at least one light source is adapted to project images within a near image plane of the windshield and a far image plane of the windshield, the parking assist graphic being displayed within the far image plane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, including autonomous or semi-autonomous vehicles, the technology is not limited to automobiles. The concepts can be used in a wide variety of applications, such as in connection with aircraft, marine craft, other vehicles, and consumer electronic components.

Figure 1:
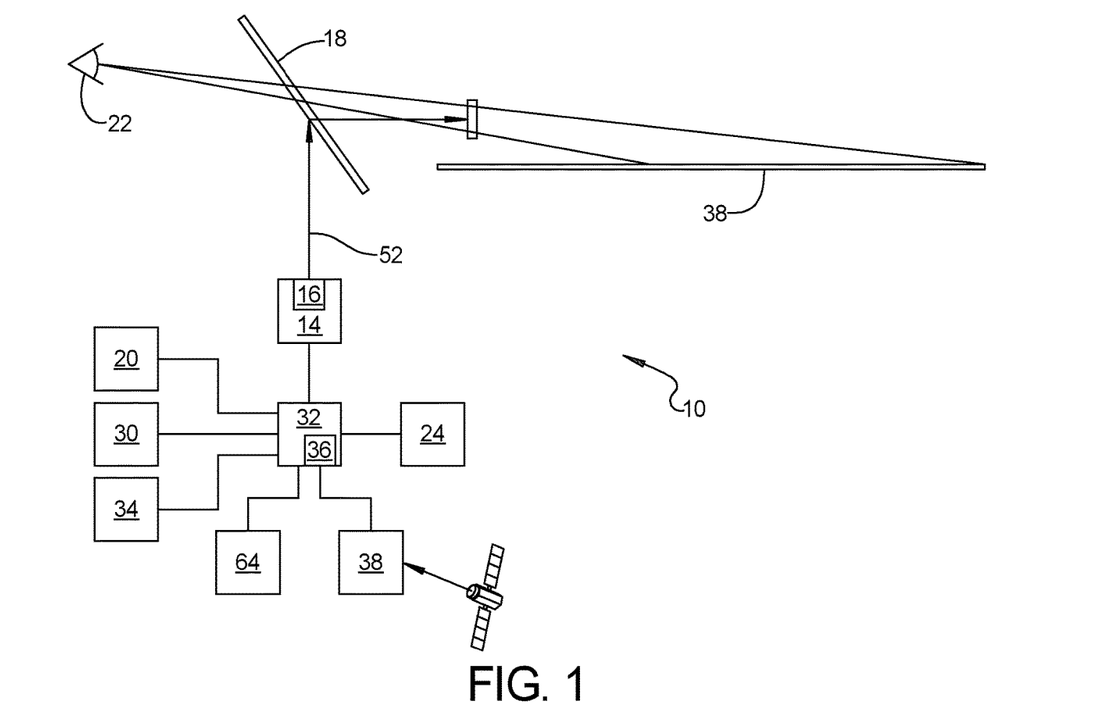
FIG. 1 is a schematic illustration of a head-up display system according to an exemplary embodiment.
Figure 2:
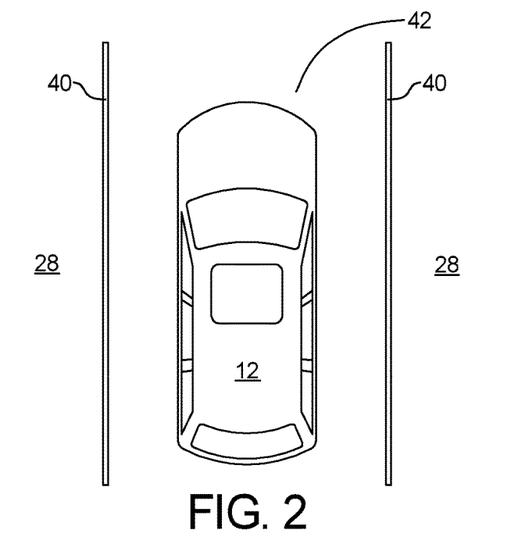
FIG. 2 is a schematic diagram of a vehicle with a parking space.

Referring to FIG. 1 and FIG. 2, a head-up system 10 for an automotive vehicle 12 according to the present disclosure includes a projection module 14 including at least one light source that is adapted to project an image upon an inner surface of a windshield 18 of the vehicle 12. As described herein, the at least one light source comprises a laser 16, however, it should be understood that the at least one light source may be other known types of light sources used in head-up display systems. In an exemplary embodiment, the projection module 14 is a holographic projection module and includes an exit pupil replicator. The holographic image is projected into the exit pupil replicator and then propagates inside the exit pupil replicator and is extracted multiple times before being projected upward to an inner surface of a windshield 18. The re-circulation of the light several times within the exit pupil replicator expands the pupil so the viewer can see the holographic image from an extended eye-box. In addition to expanding the eye-box, the exit pupil replicator also magnifies the original projected image coming out of the laser 16. A spatial light modulator is positioned between the laser 14 and the exit pupil replicator. The spatial light modulator is adapted to receive the light from the laser 16, to diffract the laser light with an encoded hologram and to deliver the diffracted laser to the exit pupil replicator. As shown and described herein, the head-up system is a holographic head-up system, however, it should be understood that the novel features of the present disclosure are applicable to other head-up display configurations.

The system 10 further includes a driver monitoring system 20 that is adapted to track a position of a driver's eyes 22, at least one non-visual sensor 24 that is adapted to detect objects 26 within an environment 28 surrounding the vehicle 12, at least one image capturing device 30 adapted to capture images of the environment 28 surrounding the vehicle 12, a controller 32, a first plurality of on-board sensors 34 adapted to detect vehicle driving characteristics, and a wireless communication module 36 adapted to receive information from external sources.

The driver monitoring system 20 includes one or more sensors, such as cameras, for determining the location of a head of the driver of the vehicle 12 as well as the orientation or gaze location of the driver's eyes 22. The at least one non-visual sensor 24 includes one or more sensors that are adapted to detect a position, velocity, and direction of travel of objects 26 in the environment 28 surrounding the vehicle 12. By way of non-limiting examples, the at least one non-visual sensor 24 may include one or more sensors such as radar, LiDAR, and infrared sensors, however, it is to be appreciated that other sensors that employ non-visual techniques to detect the presence of objects 26 may be used as well. The at least one image-capturing device 30 may include cameras that obtain periodic or sequential images of the environment 28 surrounding the vehicle 12 and objects 26 therein. The first plurality of on-board sensors 34 includes sensors mounted within the vehicle 12 that are adapted to monitor driving characteristics of the vehicle 12, including, but not limited to, speed, input angle of the steering wheel, acceleration, braking, etc.

The wireless communication module 36 is located within the controller 32 and is adapted to allow wireless communication between the vehicle 12 and other vehicles or other external sources. The controller 32 is adapted to collect information from databases via a wireless data communication network 38 over wireless communication channels such as a WLAN, 4G/LTE or 5G network, or the like. Such databases can be communicated with directly via the internet, or may be cloud-based databases. Information that may be collected by the controller 32 from such external sources includes, but is not limited to road and highway databases maintained by the department of transportation, a global positioning system, the internet, other vehicles via V2V communication networks, traffic information sources, vehicle-based support systems such as OnStar, etc.

The controller 32 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 32 is in electronic communication with the first plurality of on-board sensors 34 and the wireless communication module 36. The controller 32 is adapted to determine if the vehicle 12 is performing a parking maneuver, based on data from the first plurality of on-board sensors 34 and data received by the wireless communication module 36. For example, the controller 32 will collect data from the first plurality of on-board sensors 34 to determine vehicle speed and input angle of the steering wheel. If the vehicle 12 is travelling at a slow speed, and the steering wheel angle indicates a sharp turn, the controller 32 receives that input and identifies these as conditions indicating that a parking maneuver may be in progress. In addition, the controller 32 will collect data from external sources, such as GPS, to determine the location of the vehicle 12. If data from external sources indicates that the vehicle 12 is positioned near a parking space, or within a parking lot/structure, the controller 32 will use that data as another indication that the vehicle 12 is performing a parking maneuver.

Once the controller 32 determines that a parking maneuver is in progress, the controller 32 is further adapted to capture, with the at least one image capturing device 30, images of the environment 28 surrounding the vehicle 12, and to detect, with the at least one non-visual sensor 24, objects 26 within the environment 28 surrounding the vehicle 12. The controller 32 is in electronic communication with the projection module 14, the at least one non-visual sensor 24 and the at least one image capturing device 30.

The controller 32 uses the at least one non-visual sensor 24 and the at least one image capturing device 30 to identify location markers 40 for a parking space 42, and objects 26 within the environment 28 surrounding the vehicle 12 adjacent the parking space 42. Location markers 40 for a parking space 42 may include, but are not limited to, painted lines on the pavement, curbsides, and signage. Objects 26 that may be detected include, but are not limited to, other vehicles, signage, buildings, permanent and temporary traffic directing objects, such as barricades, cones, barrels, and guardrails, and other objects such as fallen trees, pedestrians, and animals that may be in the vicinity of the parking space 42.

The controller 32 is further adapted to determine the position of the vehicle 12 relative to the identified location markers 40 for the parking space 42 and objects 26 within the environment 28 surrounding the vehicle 12 adjacent to the parking space 42 and to display, with the projection module 14, a parking assist graphic 44 adapted to provide guidance to a driver of the vehicle 12 while parking the vehicle 12 in the parking space 42. After identifying relevant location markers 40 for the parking space 42, the controller 32 determines the position of the vehicle 12 relative to the identified location markers 40 to determine the vehicle's relative position as the vehicle 12 approaches the parking space 42. As the vehicle 12 approaches and enters the parking space 42, the controller 32 will display an appropriate parking assist graphic 44 to guide the driver of the vehicle 12 to an optimal position within the parking space 42, as determined by the controller 32.

Figure 3:
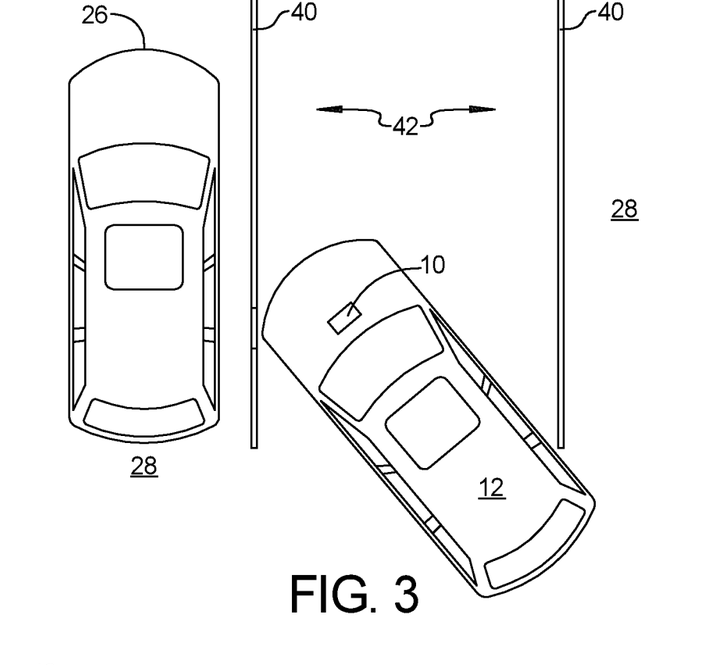
FIG. 3 is a schematic diagram of a vehicle entering a parking space.

Referring to FIG. 2, in an example, the controller 32 determines that the optimal position for the vehicle 12 within the parking space 42 is where the vehicle 12 is centered between identified location markers 40 for the parking space 42. As the vehicle 12 is entering the parking space 42, the controller 32 will display an appropriate parking assist graphic 44 to guide the driver of the vehicle 12 to a position where the vehicle 12 is centered between the identified location markers 40 for the parking space 42. In addition, the controller 32 will guide the vehicle 12 into the parking space 42 according to identified objects 26 within the environment 28 surrounding the vehicle 12 adjacent the parking space 42. Referring to FIG. 3, if there are no objects 26 adjacent the parking space 42, the controller 32 may guide the vehicle 12 along a path that overlaps the identified location markers 40 as the vehicle 12 turns into the parking space 42. However, if objects 26 are identified in the environment 28 surrounding the vehicle 12 adjacent the parking space 42 the controller 32 will provide a parking assist graphic 44 that guides the vehicle 12 along a path that does not intersect with such identified objects 26. As shown in FIG. 3, the controller 32 will provide a parking assist graphic 44 that guides the vehicle 12 along a path into the parking space 42 such that the vehicle 12 will not collide with an identified object/vehicle 26 immediately adjacent the parking space 42. Such parking assist graphics 44 may also be displayed as the vehicle 12 exists the parking space 42 to ensure the vehicle 12 does not collide with identified objects 26 adjacent the parking space 42.

Figure 4A:
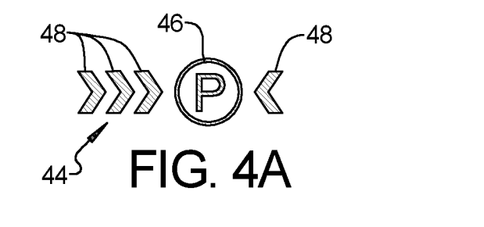
FIG. 4A is an example of a parking assist graphic in accordance with the present disclosure, wherein the parking assist graphic includes a circled P indicating the optimal position within the parking space and chevrons on either side of the circled P that indicate if the vehicle path should be altered.
Figure 4B:
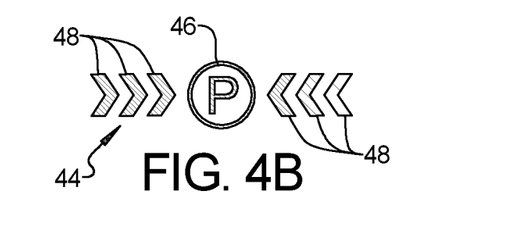
FIG. 4B is another example of a parking assist graphic wherein there are three chevrons on either side of the circled P, and the brightness or color of the chevrons on the right side vary.
Figure 4C:
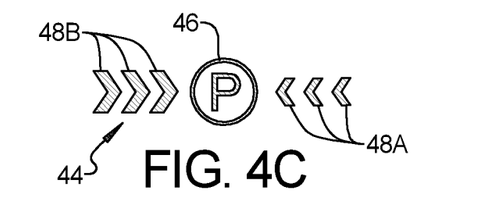
FIG. 4C is another example of a parking assist graphic wherein there are three chevrons on either side of the circled P, and the chevrons on the right side of the circled P are smaller than the chevrons on the left side of the circled P.
Figure 4D:
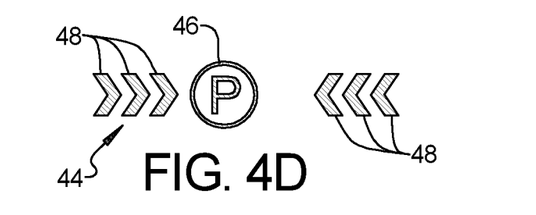
FIG. 4D is another example of a parking assist graphic wherein there are three chevrons on either side of the circled P, and the circled P is shown off-centered relative to the chevrons.

The parking assist graphic 44 is adapted to provide a visual cue to the driver indicating that the driver must adjust the path of the vehicle 12 in order to bring the vehicle 12 to the optimal location within the parking space 42. Such parking assist graphics 44 are adapted to provide instruction to the driver of the vehicle 12 that the path of the vehicle 12 should be altered to the left or right. Referring to FIGS. 4A-4F, several examples of parking assist graphics 44 providing instruction to the driver of a vehicle 12 that the path of the vehicle 12 must be altered to the left or the right are shown. Referring to FIG. 4A, the circled P 46 indicates the optimal position within the parking space 42, and the chevrons 48 on either side of the circled P 46 indicate if the vehicle 12 path should be altered. As shown, there are three chevrons 48 on the left of the circled P 46 and one chevron 48 on the right, indicating to the driver to steer more toward the left side of the parking space 42. Referring to FIG. 4B, there are three chevrons 48 on either side of the circled P 46, however, the brightness or color of the chevrons on the right side vary. Referring to FIG. 4C, there are three chevrons 48 on either side of the circled P 46, however, the chevrons 48A on the right side of the circled P 46 are smaller than the chevrons 48B on the left side of the circled P. Referring to FIG. 4D, there are three chevrons 48 on either side of the circled P 46, however, the circled P 46 is shown off-centered relative to the chevrons 48.

Figure 4E:
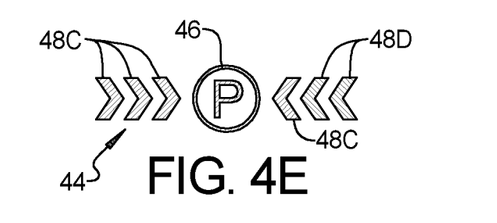
FIG. 4E is another example of a parking assist graphic wherein there are three chevrons on either side of the circled P, and the chevrons have different colors.
Figure 4F:
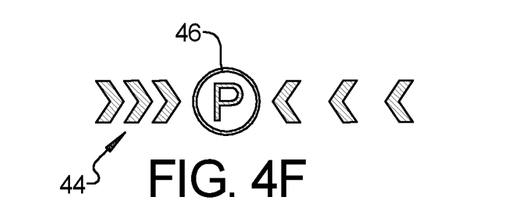
FIG. 4F is yet another example of a parking assist graphic wherein the chevrons on the left side of the circled P are spaced differently than the chevrons on the right side of the circled P.

Referring to FIG. 4E, there are three chevrons 48 on either side of the circled P 46, however the chevrons 48 have different colors. As shown, all three of the chevrons 48C on the left side of the circled P 46 are a first color. On the right side of the circled P 46, a chevron 48C closest to the circled P 46 is the first color, but the other two chevrons 48D on the right side of the circled P 46 are a second color. The number of each color chevron 48C, 48D, as well as the color chosen provides indication of the relative location of the vehicle 12 to the optimal position within the parking space 42. Finally, referring to FIG. 4F, there are three chevrons 48 on either side of the circled P 46, however, the spacing of the chevrons 48 on the left side of the circled P 46 is different than the spacing of the chevrons 48 on the right side of the circled P 46. It should be understood that the parking assist graphics 44 shown in FIGS. 4A-4F are examples, and that the parking assist graphics 44 could include other designs adapted to provide graphic indication to the driver of the relative location of the vehicle 12 to an optimal position within the parking space 43 as the vehicle 12 enters the parking space 42.

The parking assist graphic 44 may also be animated, wherein, as the vehicle 12 path changes, and the vehicle 12 approaches the optimal location within the parking space 42, the displayed parking assist graphic 44 changes. For example, as the vehicle 12 gets closer to the optimal location within the parking space 42, the displayed parking assist graphic 44 may become larger, or the color may change. Referring again to FIG. 4D, as shown the circled P 46 is not centered between the chevrons 48 on either side, however, when the driver of the vehicle 12 makes a correction and steers toward the optimal location within the parking space 42, the circled P 46 may gradually move toward a position centered between the chevrons 48. Likewise, if steering correction is not made, the color of the displayed parking assist graphic 44 may change color, such as changing to red, to reinforce the message to the driver of the vehicle 12 that corrective action should be taken. The displayed parking assist graphic 44 may also pulse or expand/contract in such circumstances.

Figure 5A:
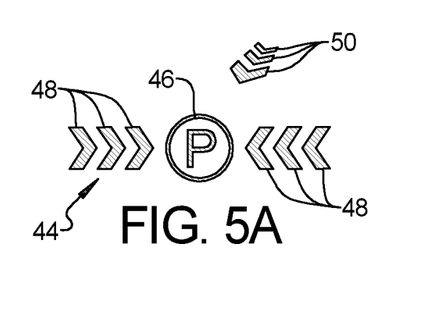
FIG. 5A is an example of a parking assist graphic including top chevrons spaced from the circled P.
Figure 5B:
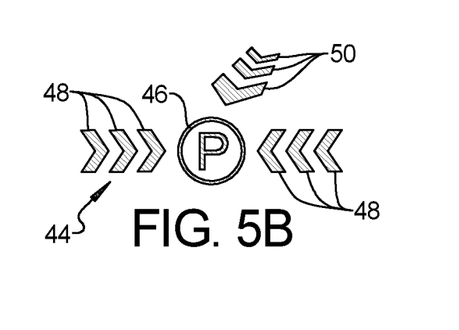
FIG. 5B is an example of a parking assist graphic including top chevrons that are not spaced from the circled P.

The parking assist graphic 44 is also adapted to provide a visual cue to the driver indicating that the vehicle 12 has fully entered the parking space 42. Such parking assist graphics 44 alert the driver to begin bringing the vehicle 12 to a stop within the parking space. Referring to FIG. 5A, a non-limiting example of a parking assist graphic 44 includes a circled P 46 and chevrons 48 on either side of the circled P 46 indicating the position left and right relative to the optimal locations within the parking space 42, as well as top chevrons 50 above the circled P 46. The top chevrons 50 above the circled P 46 provide indication to the driver of how close the vehicle 12 is to the optimal location within the parking space 42. As shown in FIG. 5A, when the vehicle 12 enters the parking space 42, the top chevrons 50 are shown spaced from the circled P 46. As shown in FIG. 5B, when the vehicle 12 has reached the optimal position within the parking space 42, the top chevrons 50 are displayed with no space from the circled P 46. In an exemplary embodiment, as the vehicle 12 approaches the optimal location within the parking space 42, the space between the top chevrons 50 and the circled P 46 gets smaller. In another exemplary embodiment, and as shown in FIG. 5B, as the vehicle 12 approaches the optimal position within the parking space 42, the top chevrons 50 become larger.

Figure 6:
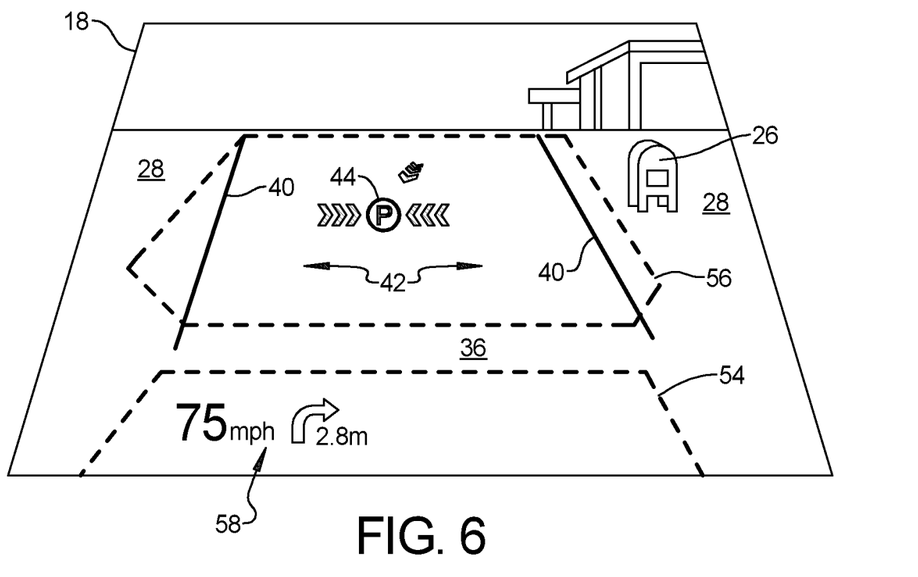
FIG. 6 is a representation of a windshield of a vehicle, wherein a parking space is visible in front of the vehicle, the HUD system displays cluster information in a near image plane and a parking assist graphic in a far image plane.

Referring again to FIG. 1, the laser 16 of the projection module 14 is adapted to project images upward to the inner surface of the windshield 18 of the vehicle 12, as indicated by arrow 52. Referring to FIG. 6, the laser 16 can project images that will appear to the driver in a near image plane 54, and images that will appear to the driver in a far image plane 56. FIG. 6 is an exemplary interior view of the windshield 18, where the environment 28 surrounding the vehicle 12 is visible through the windshield 18.

The controller 32 instructs the projection module 14 of the augmented reality head-up display system 10 to project cluster content information 58 upon the windshield 18 within the near image plane 54. The cluster content information 58 informs the driver of the vehicle 12 of driving conditions such as, but not limited to, vehicle speed, speed limit, gear position, fuel level, current position, and navigational instructions. In the example as shown in FIG. 6, the cluster content information 58 includes vehicle speed and navigational directions. In an exemplary embodiment, the augmented reality head-up display system 10 projects other relevant information upon the windshield 18 within the near-field image plane 54. Some examples of information displayed in the near plane 54 include a textual indication of the relative position of the vehicle to the location markers 40 of a parking space 43.

The controller 32 instructs the projection module 14 to project the parking assist graphic 44 upon the windshield 18 within the far image plane 56, where the parking assist graphic 44 is overlaid at a position upon the windshield 18 where the parking assist graphic 44 appears to the driver to be positioned in front of the vehicle 12 within the parking space 42. The far image plane 56 contains images that are visible through the windshield 18. In the embodiment as shown in FIG. 6, the far image plane 56 only covers a portion of the entire plane of the windshield 18, however, it is to be appreciated that in another implementation the far image plane 56 may cover the entire plane of the windshield 18 that is not occupied by the near image plane 54.

In an exemplary embodiment, the controller 32 is further adapted to continuously identify location markers 40 and objects 26 within the environment 28 surrounding the vehicle 12 adjacent to the parking space 42 and determine the position of the vehicle 12 relative to the identified location markers 40 and objects 26 within the environment 28 surrounding the vehicle 12 adjacent to the parking space 42, and to update the displayed parking assist graphic 44 as the position of the vehicle 12 relative to the identified location markers 40 and objects 26 within the environment 28 surrounding the vehicle 12 adjacent to the parking space 42 changes. The controller 32 continuously repeats this process on a periodic basis, for example, every 0.1 second. Each time the system 10 determines the position of the vehicle 12 relative to the identified location markers 40 and objects 26 within the environment 28 surrounding the vehicle 12 adjacent to the parking space 42, the displayed parking assist graphic 44 is updated accordingly if the position of the vehicle 12 has changed, or in light of newly identified or changed location markers 40 and objects 26 within the environment 28 surrounding the vehicle 12.

When determining the optimal location within the parking space 42, the controller 32 uses the identified location markers 40 for the parking space 42, identified objects 26 within the environment 28 surrounding the vehicle 12 adjacent the parking space 42, and the positions of passengers within the vehicle 12.

Referring again to FIG. 2, when no objects 26 are detected in the environment 28 surrounding the vehicle 12 adjacent to the parking space 42, the system 10 is adapted to display a parking assist graphic 44 adapted to guide the driver of the vehicle 12 to a position centered within the identified location markers 40.

Figure 7:
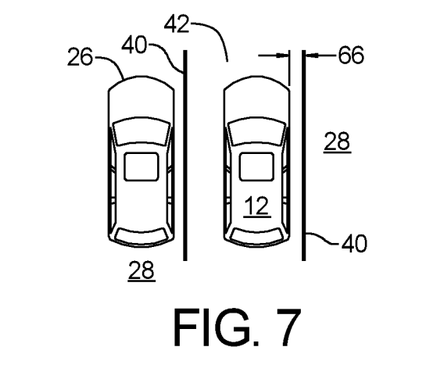
FIG. 7 is a schematic diagram of a vehicle within a parking space, wherein the vehicle is off-set from an object adjacent to the parking space.

Referring to FIG. 7, when objects 26 are detected in the environment 28 surrounding the vehicle 12 adjacent to the parking space 42 on one side, the system 10 is adapted to display a parking assist graphic 44 adapted to guide the driver of the vehicle 12 to a position within the identified location markers 40 and offset from the detected objects 26. The proximity of an object 26 (as shown another vehicle) immediately adjacent and very close to the parking space 42 on the left would make entry and exit from the vehicle 12 by the driver difficult. The controller 32, in light of the presence of the object 26 on the left, determines that the optimal position of the vehicle 12 within the parking space 42 is a position that is offset from the object 26, rather than centered within the parking space 42. When determining an offset from detected objects 26, the controller 32 will select an optimal location within the parking space 42 that is within identified location markers 40.

Figure 8:
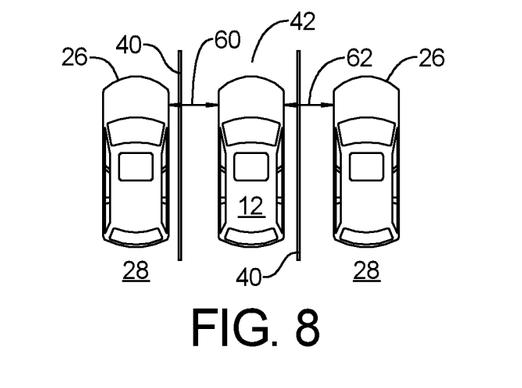
FIG. 8 is a schematic diagram of a vehicle within a parking space, wherein the vehicle is centered between objects adjacent to the parking space on both sides.

Referring to FIG. 8, when objects 26 are detected in the environment 28 surrounding the vehicle 12 adjacent to the parking space 42 on both sides, the system 10 is adapted to display a parking assist graphic 44 adapted to guide the driver of the vehicle 12 to a position within the identified location markers 40 and centered between the detected objects 26. The controller 32, in light of the presence of other objects/vehicle 26 on either side of the parking space 42, determines that the optimal position of the vehicle 12 within the parking space 42 is a position that is centered between the adjacent objects/vehicles 26. The space 60 between the vehicle 12 and the identified object/vehicle 26 on the left, is equal to the space 62 between the vehicle 12 and the identified object/vehicle 26 on the right. This will maximize the space left on either side of the vehicle 12 while still positioning the vehicle 12 within the identified location markers 40 for the parking space 42.

Figure 9:
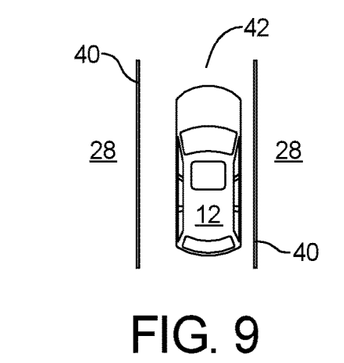
FIG. 9 is a schematic diagram of a vehicle within a parking space, wherein the vehicle is positioned off-center within the parking space.

In an exemplary embodiment, the system 10 further includes a second plurality of on-board sensors 64 in electronic communication with the controller 32 and adapted to detect locations of passengers within the vehicle 12. The second plurality of on-board sensors 64 include, but is not limited to, cameras adapted to visually identify passengers within the vehicle 12 and seat sensors adapted to detect the presence of passengers within the seats of the vehicle 12. When no objects 26 are detected in the environment 28 surrounding the vehicle 12 adjacent to the parking space 42, the system 10 is adapted to display a parking assist graphic 44 adapted to guide the driver of the vehicle 12 to a position offset within the identified location markers 40 based on the location of passengers within the vehicle 12. For example, referring to FIG. 9, when the second plurality of on-board sensors 64 detects the presence of only a driver within the vehicle 12, the controller 32 determines that an optimal location within the parking space 42 is offset to one side, giving the driver of the vehicle 12 more room within the identified location markers 40 to enter and exit the vehicle 12. Even though no objects 26 may be identified when parking, it is possible that other vehicles could park next to the vehicle 12 and leave little room for the driver to enter the vehicle 12 when leaving. To avoid this situation, the controller 32 selects an optimal position that leaves extra room within the identified location markers 40.

In an exemplary embodiment, when objects 26 are detected in the environment 28 surrounding the vehicle 12 adjacent to the parking space 42 on one side, the system 10 is adapted to display a parking assist graphic 44 adapted to guide the driver of the vehicle 12 to a position within the identified location markers 40 and offset relative to the detected objects 26 based on the location of passengers within the vehicle 12. Referring again to FIG. 7, when the controller 32 detects an object/vehicle 26 immediately adjacent the parking space 42 on the left, and only the driver of the vehicle 12 is detected by the second plurality of on-board sensors 64, the controller 32 selects an optimal position that is off-center within the identified location markers 40 and off-set from the identified object/vehicle 26 to maximize the room the driver of the vehicle 12 has to enter and exit the vehicle 12. In this circumstance, the controller 32 may select an optimal position wherein the distance 66 between the right side of the vehicle 12 and the location marker 40 for the parking space 42 on the right side is very small. The distance 66 between the vehicle 12 and the location marker 40 for the parking space 42 on the right side is minimized. As there are no passengers on the right side of the vehicle 12, no room is necessary for entry and exit to and from the vehicle 12 on the right side.

Figure 10:
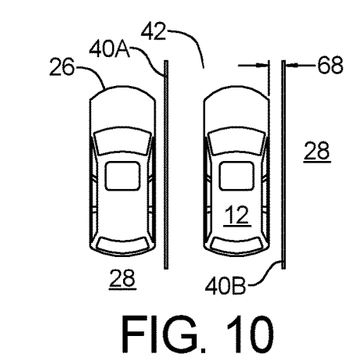
FIG. 10 is a schematic diagram similar to FIG. 7, wherein the vehicle is positioned within the parking space with sufficient room for passengers to exit the vehicle on the right side.

Alternatively, referring to FIG. 10, when the controller 32 detects an object/vehicle 26 immediately adjacent the parking space 42 on the left, and passengers are detected by the second plurality of on-board sensors 64 on both sides of the vehicle 12, the controller 32 selects an optimal position that is off-center within identified location markers 40A, 40B and off-set from the identified object/vehicle 26 to provide room for the driver of the vehicle 12 to enter and exit the vehicle 12. The space 68 between the vehicle 12 and the location marker 40B for the parking space 42 on the right side is sufficient to allow entry and exit to and from the vehicle 12 by a passenger on the right side. When passengers on the right side of the vehicle 12 are present, the vehicle 12 is still offset toward the right side location marker 40B, but not as much as shown in FIG. 7, wherein no passengers on the right side are present.

In an exemplary embodiment, when objects 26 are detected in the environment 28 surrounding the vehicle 12 adjacent to the parking space 42 on both sides, the system 10 is adapted to display a parking assist graphic 44 adapted to guide the driver of the vehicle 12 to a position within the identified location markers 40A, 40B and offset between the detected objects 26 in the environment 28 surrounding the vehicle 12 adjacent to the parking space 42 on both sides, based on the location of passengers within the vehicle 12.

Figure 11:
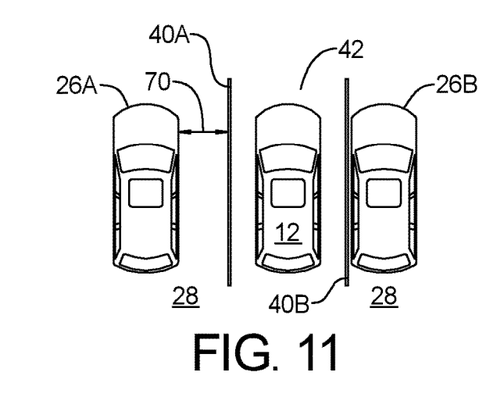
FIG. 11 is a schematic diagram similar to FIG. 8, wherein the vehicle is offset between objects on both sides of the parking space based on passengers being only on the left side of the vehicle.

Referring to FIG. 11, objects/vehicles 26A, 26B are detected on both sides of the parking space 42, and the second plurality of on-board sensors 64 detects passengers only on the driver's side (left side) of the vehicle 12. The object/vehicle 26A on the left of the parking space 42, is positioned at a distance 70 from the parking space 42. Thus, the controller 32 determines that the optimal position within the parking space 42 is a position that is centered within the identified location markers 40A, 40B. The distance 70 between the object/vehicle 26C on the left provides sufficient room for passengers on the left side of the vehicle 12 to enter and exit the vehicle 12, thus no off-set is necessary, and the optimal position is centered within the identified location markers 40A, 40B.

Figure 12:
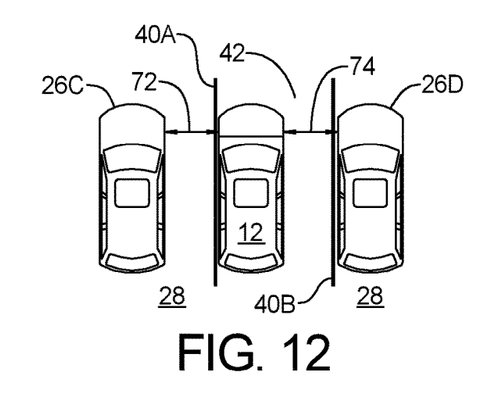
FIG. 12 is a schematic diagram similar to FIG. 8, wherein the vehicle is offset between objects on both sides of the parking space based on passengers being on both sides of the vehicle.

Alternatively, referring to FIG. 12, objects/vehicles 26C, 26D are detected on both sides of the parking space 42, and the second plurality of on-board sensors 64 detects passengers on both sides of the vehicle 12. The object/vehicle 26C on the left of the parking space 42, is positioned at a distance 72 from the parking space 42. Thus, the controller 32 determines that the optimal position within the parking space 42 is a position that is off-set toward the left side of the parking space 42. The distance 72 between the vehicle 12 and the object/vehicle 26C on the left side of the parking space 42 is equal to a distance 74 between the vehicle 12 and the object/vehicle 26D on the right side of the parking space 42. This provides equal space for passengers to enter and exit the vehicle 12 on either side of the vehicle 12.

In another exemplary embodiment, the system 10 is adapted to be selectively actuated by the driver and to be actuated automatically when the vehicle 12 begins a parking maneuver. The driver 12 can manually actuate the system 10 when performing a parking maneuver, or the system 10 can run in an automatic mode, wherein, the system 10 runs in the background, without displaying anything, and when the controller 32 determines that the vehicle 12 is performing a parking maneuver, the system 10 will begin displaying parking assist graphics 44.

The system 10 obtains information of the position of the eyes 22 of a driver of the vehicle 12 from a camera of the driver monitoring system 20 within the vehicle 12. The driver monitoring system 20 uses the camera to identify the facial features of the driver and provides information on the vertical location of the eyes 22 of the driver to the controller 32. The laser 16 of the projection module 14 is adapted to project an image upward to the windshield 18 within the vehicle 12. The projected image reflects from an inner surface of the windshield 18 to an eye-box. The eye-box is the three-dimensional region within which a driver of the vehicle 12 can see the entire projected image from the HUD system. The look down angle (LDA) is the angle at which the eyes 22 of a driver are oriented relative to the virtual image projected to the eyes 22 of the driver. The virtual image distance (VID) is the distance from the driver's eyes the virtual image is perceived by the driver. To accommodate for driver's of different heights, the LDA and the VID are adjustable to ensure the image projected by the projection module 14 is perceived at the proper location by all drivers.

The controller 32 is adapted to determine the distance that the vertical location of the driver's eyes 22 varies from the pre-determined nominal vertical position. Based on the distance at which the driver's eyes 22 are either higher or lower than the nominal vertical position, the projection module 14 can adjust the LDA of the holographic image projected by the laser 16 to properly position the displayed parking assist graphic 44 for the driver of the vehicle 12.

Figure 13:
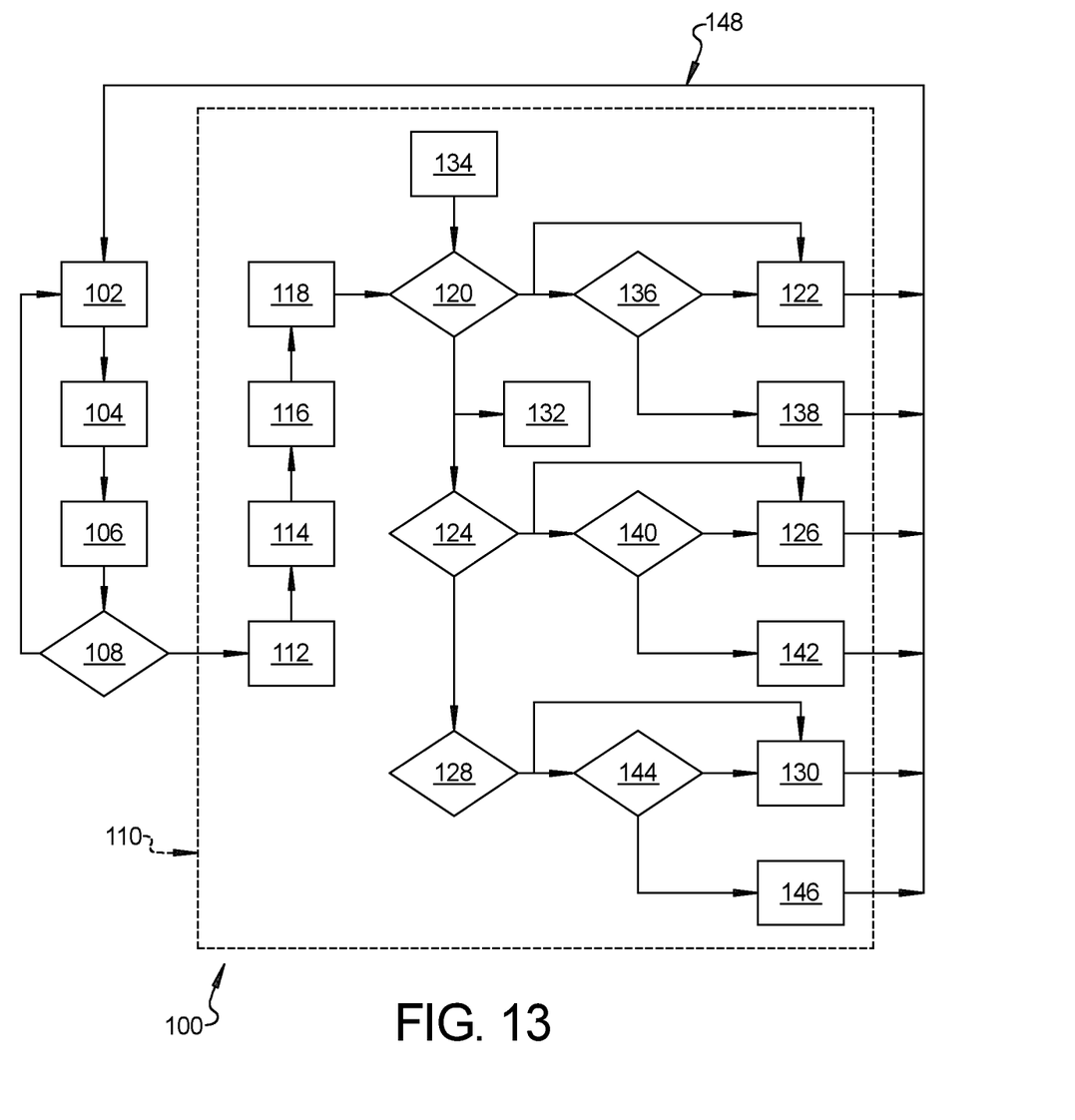
FIG. 13 is a schematic flowchart illustrating a method according to an exemplary embodiment of the present disclosure.

Referring to FIG. 13, a method 100 of providing parking assistance to a driver of a vehicle 12 with a head-up system 10 includes, moving to block 102, detecting, with a first plurality of on-board sensors 34, vehicle driving characteristics, moving to block 104, receiving, with a wireless communication module 36, information from external sources, moving to block 106, tracking, with a driver monitoring system 20, a position of the driver's eyes 22, moving to block 108, determining, with a controller 32 in electronic communication with the first plurality of on-board sensors 34 and the wireless communication module 36 if the vehicle 10 is performing a parking maneuver, based on data from the first plurality of on-board sensors 34 and data received by the wireless communication module 36, and moving to block 110, when the vehicle 12 is performing a parking maneuver, displaying, with at least one light source of a projection module 14 adapted to project an image upon an inner surface of a windshield 18 of the vehicle 12 and in electronic communication with the controller 32, a parking assist graphic 44 adapted to provide guidance to a driver of the vehicle 12 while parking the vehicle 12 in a parking space 42.

In an exemplary embodiment, the displaying, with the at least one light source of the projection module 14 adapted to project an image upon an inner surface of a windshield 18 of the vehicle 12 and in electronic communication with the controller 32, a parking assist graphic 44 adapted to provide guidance to a driver of the vehicle 12 while parking the vehicle 12 in a parking space 42 at block 110 further includes, moving to block 112, capturing, with at least one image capturing device 30 in electronic communication with the controller 32, images of an environment 28 surrounding the vehicle 12, moving to block 114, detecting, with at least one non-visual sensor 24 in electronic communication with the controller 32, objects 26 within the environment 28 surrounding the vehicle 12, moving to block 116, identifying, with the controller 32, the at least one image capturing device 30, and the at least one non-visual sensor 24, location markers 40 for the parking space 42 and objects 26 within the environment 28 surrounding the vehicle 12 adjacent to the parking space 42, and, moving to block 118, determining, with the controller 32, the position of the vehicle 12 relative to the identified location markers 40 for the parking space 42 and objects 26 within the environment 28 surrounding the vehicle 12 adjacent to the parking space 42.

In an exemplary embodiment, moving to block 120, when no objects 26 are detected in the environment 28 surrounding the vehicle 12 adjacent to the parking space 42, the displaying a parking assist graphic 44 further includes, moving to block 122, displaying, with the at least one light source of the projection module 14, a parking assist graphic 44 adapted to guide the driver of the vehicle 12 to a position centered within the identified location markers 40.

Moving again to block 120, when objects 26 are detected in the environment 28 surrounding the vehicle 12 adjacent to the parking space 42, moving to block 124, and when the objects 26 detected are on one side of the parking space 42, then, the displaying a parking assist graphic 44 further includes, moving to block 126, displaying, with the at least one light source of the projection module 14, a parking assist graphic 44 adapted to guide the driver of the vehicle 12 to a position within the identified location markers 40 and offset from the detected objects 26 in the environment 28 surrounding the vehicle 12 adjacent to the parking space 42 on one side.

Moving again to block 120, when objects 26 are detected in the environment 28 surrounding the vehicle 12 adjacent to the parking space 42, moving to block 128, and when the objects 26 detected are on both sides of the parking space 42, then, the displaying a parking assist graphic 44 further includes, moving to block 130, displaying, with the at least one light source of the projection module 14, a parking assist graphic 44 adapted to guide the driver of the vehicle 12 to a position within the identified location markers 40 and centered between the detected objects 26 in the environment 28 surrounding the vehicle 12 adjacent to the parking space 42 on both sides.

In another exemplary embodiment, moving to block 132, when objects 26 are detected in the environment 28 surrounding the vehicle 12 adjacent to the parking space 42 at block 120, the displaying a parking assist graphic 44 further includes, moving to block 132, displaying, with the at least one light source of the projection module 14, a parking assist graphic 44 adapted to guide the driver of the vehicle 12 while entering and exiting the parking space 42 to avoid the detected objects 26 in the environment 28 surrounding the vehicle 12 adjacent to the parking space 42.

In another exemplary embodiment, the system 10 further includes a second plurality of on-board sensors 64 in electronic communication with the controller 32, the method 100 further including, moving to block 134, detecting, with the second plurality of on-board sensors 64 in electronic communication with the controller 32, locations of passengers within the vehicle 12.

When no objects 26 are detected in the environment 28 surrounding the vehicle 12 adjacent to the parking space 42, the displaying a parking assist graphic 44 further includes, displaying, with the at least one light source of the projection module 14, a parking assist graphic 44 adapted to guide the driver of the vehicle 12 to a position offset within the identified location markers 40 based on the location of passengers within the vehicle 12.

In an exemplary embodiment, moving to block 120, when no objects 26 are detected in the environment 28 surrounding the vehicle 12 adjacent to the parking space 42, and, moving to block 136, if the controller 32 determines that an offset is not required based on location of the passengers within the vehicle 12, then, the displaying a parking assist graphic 44 further includes, moving to block 122, displaying, with the at least one light source of the projection module 14, a parking assist graphic 44 adapted to guide the driver of the vehicle 12 to a position centered within the identified location markers 40. Alternatively, moving to block 120, when no objects 26 are detected in the environment 28 surrounding the vehicle 12 adjacent to the parking space 42, and, moving to block 136, if the controller 32 determines that an offset is required based on location of the passengers within the vehicle 12, then, the displaying a parking assist graphic 44 further includes, moving to block 138, displaying, with the at least one light source of the projection module 14, a parking assist graphic 44 adapted to guide the driver of the vehicle 12 to a position that is offset within the identified location markers 40, based on location of the passengers within the vehicle 12.

When objects 26 are detected in the environment 28 surrounding the vehicle 12 adjacent to the parking space 42 on one side, the displaying a parking assist graphic 44 further includes, displaying, with the at least one light source of the projection module 14, a parking assist graphic 44 adapted to guide the driver of the vehicle 12 to a position within the identified location markers 40 and offset relative to the detected objects 26 in the environment 28 surrounding the vehicle 12 adjacent to the parking space 42 on one side, based on the location of passengers within the vehicle 12.

In an exemplary embodiment, moving again to block 120, when objects 26 are detected in the environment 28 surrounding the vehicle 12 adjacent to the parking space 42, moving to block 124, and when the objects 26 detected are on one side of the parking space 42, and, moving to block 140, if the controller 32 determines that an offset is not required based on location of the passengers within the vehicle 12 then, the displaying a parking assist graphic 44 further includes, moving to block 126, displaying, with the at least one light source of the projection module 14, a parking assist graphic 44 adapted to guide the driver of the vehicle 12 to a position within the identified location markers 40 and offset from the detected objects 26 in the environment 28 surrounding the vehicle 12 adjacent to the parking space 42 on one side. Alternatively, moving again to block 120, when objects 26 are detected in the environment 28 surrounding the vehicle 12 adjacent to the parking space 42, moving to block 124, and when the objects 26 detected are on one side of the parking space 42, and, moving to block 140, if the controller 32 determines that an offset is required based on location of the passengers within the vehicle 12, then, the displaying a parking assist graphic 44 further includes, moving to block 142, displaying, with the at least one light source of the projection module 14, a parking assist graphic 44 adapted to guide the driver of the vehicle 12 to a position that is offset within the identified location markers 40, based on location of the passengers within the vehicle 12.

When objects 26 are detected in the environment 28 surrounding the vehicle 12 adjacent to the parking space 42 on both sides, the displaying a parking assist graphic 44 further includes, displaying, with the at least one light source of the projection module 14, a parking assist graphic 44 adapted to guide the driver of the vehicle 12 to a position within the identified location markers 40 and offset between the detected objects 26 in the environment 28 surrounding the vehicle 12 adjacent to the parking space 42 on both sides, based on the location of passengers within the vehicle 12.

Moving again to block 120, when objects 26 are detected in the environment 28 surrounding the vehicle 12 adjacent to the parking space 42, moving to block 128, and when the objects 26 detected are on both sides of the parking space 42, and, moving to block 144, if the controller 32 determines that an offset is not required based on location of the passengers within the vehicle 12 then, the displaying a parking assist graphic 44 further includes, moving to block 130, displaying, with the at least one light source of the projection module 14, a parking assist graphic 44 adapted to guide the driver of the vehicle 12 to a position within the identified location markers 40 and centered between the detected objects 26 in the environment 28 surrounding the vehicle 12 adjacent to the parking space 42 on both sides. Alternatively, moving again to block 120, when objects 26 are detected in the environment 28 surrounding the vehicle 12 adjacent to the parking space 42, moving to block 128, and when the objects 26 detected are on both sides of the parking space 42, and, moving to block 144, if the controller 32 determines that an offset is required based on location of the passengers within the vehicle 12 then, the displaying a parking assist graphic 44 further includes, moving to block 146, displaying, with the at least one light source of the projection module 14, a parking assist graphic 44 adapted to guide the driver of the vehicle 12 to a position within the identified location markers 40 and off-set between the detected objects 26 in the environment 28 surrounding the vehicle 12 adjacent to the parking space 42 on both sides, based on the location of passengers within the vehicle 12.

In an exemplary embodiment, the controller 32 is further adapted to continuously identify location markers 40 and objects 26 within the environment 28 surrounding the vehicle 12 adjacent to the parking space 42 and determine the position of the vehicle 12 relative to the identified location markers 40 and objects 26 within the environment 28 surrounding the vehicle 12 adjacent to the parking space 42, the method 100 further including, updating the displayed parking assist graphics 44 as the position of the vehicle 12 relative to the identified location markers 40 and objects 26 within the environment 28 surrounding the vehicle 12 adjacent to the parking space 42 changes, as indicated by arrow 148.

In an exemplary embodiment, the projection module 14 is adapted to project images within a near image plane 54 of the windshield 18 and a far image plane 56 of the windshield 18, the displaying, with at least one light source of a projection module 14 adapted to project an image upon an inner surface of a windshield 18 of the vehicle 12 and in electronic communication with the controller 32, a parking assist graphic 44 adapted to provide guidance to a driver of the vehicle 12 while parking the vehicle 12 in a parking space at block 110 further includes, displaying the parking assist graphic 44 within the far image plane 56.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing parking assistance to a driver of a vehicle with a head-up system, comprising:
    detecting, with a first plurality of on-board sensors, vehicle driving characteristics;
    receiving, with a wireless communication module, information from external sources;
    tracking, with a driver monitoring system, a position of the driver's eyes;
    determining, with a controller in electronic communication with the first plurality of on-board sensors and the wireless communication module if the vehicle is performing a parking maneuver, based on data from the first plurality of on-board sensors and data received by the wireless communication module; and
    when the vehicle is performing a parking maneuver, displaying, with at least one light source of a projection module adapted to project an image upon an inner surface of a windshield of the vehicle and in electronic communication with the controller, a parking assist graphic adapted to provide guidance to a driver of the vehicle while parking the vehicle in a parking space;
    the method further including, with the controller:
        animating the displayed parking assist graphic;
        at least one of modifying the parking assist graphic and modifying the animation of the parking assist graphic as the vehicle approaches an optimal position within the parking space; and
        at least one of modifying the parking assist graphic and modifying the animation of the parking assist graphic if the vehicle moves away from the optimal position within the parking space.

2. The method of claim 1, wherein the displaying, with the at least one light source of the projection module adapted to project an image upon an inner surface of a windshield of the vehicle and in electronic communication with the controller, a parking assist graphic adapted to provide guidance to a driver of the vehicle while parking the vehicle in a parking space further includes:
    capturing, with at least one image capturing device in electronic communication with the controller, images of an environment surrounding the vehicle;
    detecting, with at least one non-visual sensor in electronic communication with the controller, objects within the environment surrounding the vehicle;
    identifying, with the controller, the at least one image capturing device, and the at least one non-visual sensor, location markers for the parking space and objects within the environment surrounding the vehicle adjacent to the parking space; and
    determining, with the controller, the position of the vehicle relative to the identified location markers for the parking space and objects within the environment surrounding the vehicle adjacent to the parking space.

3. The method of claim 2, wherein, when no objects are detected in the environment surrounding the vehicle adjacent to the parking space, the displaying parking assist graphics further includes, displaying, with the at least one light source of the projection module, a parking assist graphic adapted to guide the driver of the vehicle to a position centered within the identified location markers.

4. The method of claim 3, wherein, when objects are detected in the environment surrounding the vehicle adjacent to the parking space on one side, the displaying parking assist graphics further includes, displaying, with the at least one light source of the projection module, a parking assist graphic adapted to guide the driver of the vehicle to a position within the identified location markers and offset from the detected objects in the environment surrounding the vehicle adjacent to the parking space on one side.

5. The method of claim 4, wherein, when objects are detected in the environment surrounding the vehicle adjacent to the parking space on both sides, the displaying parking assist graphics further includes, displaying, with the at least one light source of the projection module, a parking assist graphic adapted to guide the driver of the vehicle to a position within the identified location markers and centered between the detected objects in the environment surrounding the vehicle adjacent to the parking space on both sides.

6. The method of claim 5, wherein, when objects are detected in the environment surrounding the vehicle adjacent to the parking space, the displaying parking assist graphics further includes, displaying, with the at least one light source of the projection module, a parking assist graphic adapted to guide the driver of the vehicle while entering and exiting the parking space to avoid the detected objects in the environment surrounding the vehicle adjacent to the parking space.

7. The method of claim 6, further including detecting, with a second plurality of on-board sensors in electronic communication with the controller, locations of passengers within the vehicle.

8. The method of claim 7, wherein, when no objects are detected in the environment surrounding the vehicle adjacent to the parking space, the displaying parking assist graphics further includes, displaying, with the at least one light source of the projection module, a parking assist graphic adapted to guide the driver of the vehicle to a position offset within the identified location markers based on the location of passengers within the vehicle.

9. The method of claim 8, wherein, when objects are detected in the environment surrounding the vehicle adjacent to the parking space on one side, the displaying parking assist graphics further includes, displaying, with the at least one light source of the projection module, a parking assist graphic adapted to guide the driver of the vehicle to a position within the identified location markers and offset relative to the detected objects in the environment surrounding the vehicle adjacent to the parking space on one side, based on the location of passengers within the vehicle.

10. The method of claim 9, wherein, when objects are detected in the environment surrounding the vehicle adjacent to the parking space on both sides, the displaying parking assist graphics further includes, displaying, with the at least one light source of the projection module, a parking assist graphic adapted to guide the driver of the vehicle to a position within the identified location markers and offset between the detected objects in the environment surrounding the vehicle adjacent to the parking space on both sides, based on the location of passengers within the vehicle.

11. The method of claim 10, wherein, the controller is further adapted to continuously identify location markers and objects within the environment surrounding the vehicle adjacent to the parking space and determine the position of the vehicle relative to the identified location markers and objects within the environment surrounding the vehicle adjacent to the parking space, the method further including updating the displayed parking assist graphic as the position of the vehicle relative to the identified location markers and objects within the environment surrounding the vehicle adjacent to the parking space changes.

12. The method of claim 11, wherein the system is adapted to be selectively actuated by the operator and to be actuated automatically when the vehicle begins a parking maneuver.

13. The method of claim 12, wherein the at least one light source is adapted to project images within a near image plane of the windshield and a far image plane of the windshield, the displaying, with at least one light source of a projection module adapted to project an image upon an inner surface of a windshield of the vehicle and in electronic communication with the controller, a parking assist graphic adapted to provide guidance to a driver of the vehicle while parking the vehicle in a parking space further includes, displaying the parking assist graphics within the far image plane.

14. A head-up display system for an automotive vehicle, comprising:
a first plurality of on-board sensors adapted to detect vehicle driving characteristics;
a wireless communication module adapted to receive information from external sources;
a driver monitoring system adapted to track a position of a driver's eyes; and
a controller in electronic communication with the first plurality of on-board sensors and the wireless communication module, the controller adapted to determine if the vehicle is performing a parking maneuver, based on data from the first plurality of on-board sensors and data received by the wireless communication module, and, when the vehicle is performing a parking maneuver, to:
capture, with at least one image capturing device in electronic communication with the controller, images of an environment surrounding the vehicle;
detect, with at least one non-visual sensor in electronic communication with the controller, objects within the environment surrounding the vehicle;
identify, with the controller, the at least one image capturing device, and the at least one non-visual sensor, location markers for a parking space and objects within the environment surrounding the vehicle adjacent to the parking space;
determine the position of the vehicle relative to the identified location markers for the parking space and objects within the environment surrounding the vehicle adjacent to the parking space;
display, with at least one light source of a projection module adapted to project an image upon an inner surface of a windshield of the vehicle and in electronic communication with the controller, a parking assist graphic adapted to provide guidance to a driver of the vehicle while parking the vehicle in the parking space;
animate the displayed parking assist graphic;
at least one of modify the parking assist graphic and modify the animation of the parking assist graphic as the vehicle approaches an optimal position within the parking space; and
at least one of modify the parking assist graphic and modify the animation of the parking assist graphic if the vehicle moves away from the optimal position within the parking space.

15. The system of claim 14, wherein, when no objects are detected in the environment surrounding the vehicle adjacent to the parking space, the system is adapted to display a parking assist graphic adapted to guide the driver of the vehicle to a position centered within the identified location markers.

16. The system of claim 15, wherein, when objects are detected in the environment surrounding the vehicle adjacent to the parking space, the system is adapted to:
display a parking assist graphic adapted to guide the driver of the vehicle to a position within the identified location markers and offset from the detected objects, when the detected objects are located in the environment surrounding the vehicle adjacent to the parking space on one side;
display a parking assist graphic adapted to guide the driver of the vehicle to a position within the identified location markers and centered between the detected objects, when the detected objects are located in the environment surrounding the vehicle adjacent to the parking space on both sides; and
display a parking assist graphic adapted to guide the driver of the vehicle while entering and exiting the parking space to avoid the detected objects in the environment surrounding the vehicle adjacent to the parking space.

17. The system of claim 16, further including a second plurality of on-board sensors in electronic communication with the controller and adapted to detect locations of passengers within the vehicle, wherein:

when no objects are detected in the environment surrounding the vehicle adjacent to the parking space, the system is adapted to display a parking assist graphic adapted to guide the driver of the vehicle to a position offset within the identified location markers based on the location of passengers within the vehicle;

when objects are detected in the environment surrounding the vehicle adjacent to the parking space on one side, the system is adapted to display a parking assist graphic adapted to guide the driver of the vehicle to a position within the identified location markers and offset relative to the detected objects based on the location of passengers within the vehicle; and when objects are detected in the environment surrounding the vehicle adjacent to the parking space on both sides, the system is adapted to display a parking assist graphic adapted to guide the driver of the vehicle to a position within the identified location markers and offset between the detected objects in the environment surrounding the vehicle adjacent to the parking space on both sides, based on the location of passengers within the vehicle.

18. The system of claim 17, wherein, the controller is further adapted to continuously identify location markers and objects within the environment surrounding the vehicle adjacent to the parking space and determine the position of the vehicle relative to the identified location markers and objects within the environment surrounding the vehicle adjacent to the parking space, and update the displayed parking assist graphic as the position of the vehicle relative to the identified location markers and objects within the environment surrounding the vehicle adjacent to the parking space changes.

19. The system of claim 18, wherein the system is adapted to be selectively actuated by the operator and to be actuated automatically when the vehicle begins a parking maneuver.

20. The system of claim 19, wherein the at least one light source is adapted to project images within a near image plane of the windshield and a far image plane of the windshield, the parking assist graphic being displayed within the far image plane.

* * * * *